United States Patent
Brunkhardt et al.

(10) Patent No.: US 7,474,328 B2
(45) Date of Patent: Jan. 6, 2009

(54) METHOD FOR RECOMPOSING LARGE FORMAT MEDIA

(76) Inventors: Benjamin P. Brunkhardt, 10833 Wilshire Blvd., Apt. 609, Los Angeles, CA (US) 90024; Erik W. Courtney, 3110 Barrington Ave., Los Angeles, CA (US) 90066

( * ) Notice: Subject to any disclaimer, the term of this patent is extended or adjusted under 35 U.S.C. 154(b) by 0 days.

(21) Appl. No.: 11/101,359

(22) Filed: Apr. 7, 2005

(65) Prior Publication Data

US 2005/0286885 A1    Dec. 29, 2005

Related U.S. Application Data

(60) Provisional application No. 60/561,061, filed on Apr. 8, 2004.

(51) Int. Cl.
*H04N 7/18*    (2006.01)

(52) U.S. Cl. ............... 348/96; 348/97; 348/98

(58) Field of Classification Search .......... 348/90–120
See application file for complete search history.

(56) References Cited

U.S. PATENT DOCUMENTS 5,534,954 A * 7/1996 Vetter ..................... 352/79
5,671,008 A * 9/1997 Linn ....................... 348/97
6,801,334 B1 * 10/2004 Enomoto ................. 358/1.18
6,980,226 B2 * 12/2005 Jones et al. .............. 347/225

OTHER PUBLICATIONS

Eastman Kodak Company, Kodak Student Filmmaker's Handbook, Kodak Publication No. H-19a, Sep. 2001, pp. 162-163.
John Hedgecoe, The Photographer's Handbook, Third Edition, Oct. 1, 1992, pp. 328-329 and 339.
SMPTE Standard for Motion-Picture Film (35-mm)—Perforated KS, SMPTE 139-2003 (Revision of ANSI/SMPTE 139-1996), approved Nov. 12, 2003, The Society of Motion Picture and Television Engineers, White Plains, NY 10607.
UCLA Students Make Innovative Use of Large Film Format, Kodak In Camera, Jul. 2005, 2 pages.
Brunkhardt, Ben, LFNR—Large Format Negative Repurposing, SMPTE Motion Imaging Journal, May/Jun. 2006, 9 pages.
Hyder, James, Student LF Film of Lincoln Assassination, LF Examiner, Sep. 2004, vol. 7, No. 9, 5 pages.

* cited by examiner

*Primary Examiner*—Andy S Rao
(74) *Attorney, Agent, or Firm*—Polsinelli Shalton Flanigan Suelthaus PC (57) ABSTRACT

The present invention relates to a process for shooting an entire scene on a single large format film camera and recomposing the filmed scene into a video stream suitable for transfer to conventional formats.

41 Claims, 7 Drawing Sheets

METHOD FOR RECOMPOSING LARGE FORMAT MEDIA

CROSS-REFERENCES TO RELATED APPLICATIONS

This application is related to and claims priority from commonly owned U.S. Provisional Patent Application Ser. No. 60/561,061, entitled Method For Recomposing Large Format Media, filed on Apr. 8, 2004. U.S. Provisional Patent Application Ser. No. 60/561,061 is incorporated by reference herein.

FIELD OF THE INVENTION

The present invention is directed to cinematographic processes. In particular, the present invention is directed to a process for shooting an entire scene on a single large format film camera and recomposing the filmed scene into a video stream suitable for transfer to conventional formats.

BACKGROUND OF THE INVENTION

Large format filmmaking is an expensive process, as it involves shooting the film and processing it. Additionally, there are very few theatres equipped for showing large format films. As a result, large format film technology is underutilized, and the number of large format films made is limited. Ultimately, most moviegoers have few, if any, chances to watch large format films.

As a result of the limited access and expense to make large format films, filmmakers commonly resort to multiple conventional (non-large format cameras) camera set-ups to shoot a single scene for a film. The multiple camera set-ups are labor and time intensive. Scenes from each camera are then transferred into the desired video stream. However, the resultant film or digital video sequence, from using standard 35 millimeter (mm) film or digital video is limited. This is due mainly to this film having limited resolution in recomposing the negatives, when compared to that of large format film.

The drawbacks of the contemporary art are best shown by the following example. If a filmmaker wants to film a scene about birds, it is not practical to film a single bird flying amongst a flock. Moreover, it is difficult, if not impossible, to keep the bird (to which filming is desired) centered or focused as desired within the frame, or even in the frame, by even the most skilled camera operator. Moreover, there is no known way to keep a close-up shot on a subject that can not be choreographed, and maintain a high quality image.

SUMMARY OF THE INVENTION

The present invention provides a new method for utilizing processed film shot on large format motion picture cameras. The invention also overcomes the drawbacks of the contemporary art by allowing a scene to be shot on a single large format camera, while allowing the resultant film to be recomposed into a video stream transferable to conventional formats. As a result of this process, while filming a subject, there is no longer a need to maintain a desired frame of just the subject, when filming, as the subject need only be somewhere in the filmed frame. Moreover, the present invention allows the filmmaker to create a close-up shot, from a filmed shot, on a subject that can not be choreographed, and recompose this shot as a high quality image.

This is illustrated by turning back to the example above. With the process of the invention, a single bird of a flock can be centered in each frame of a video stream with certainty and high resolution. This single bird can be isolated in each of the frames of the processed large format film, shot of the flock. Typical processed film for large format film includes negatives, positives, interpositives, internegatives, and the like. For example, this processed film can be 65 millimeter (mm) negatives, positives, internegatives, interpositives, and 70 mm prints. These frames need only include the desired bird, either alone, with other birds in the flock, or within the entire flock. These frames can then be recomposed, to form a video stream of the resultant single bird, from all of the frames, regardless of the position of this single bird in the frames, from which the video stream was recomposed. This result is simply not possible with the contemporary art, at broadcast quality.

The present invention can also be utilized in situations where it is not possible to capture an event with multiple cameras. By using only a single camera, the scene can be filmed (shot) efficiently and economically.

Additionally, as the result of a wide shot initially being taken from a single camera, problems of lighting continuity, and crossing the 180° line (commonly known as the director's line) are not encountered during editing the film. Also, the editor has a potential resource, in which numerous shots of individual segments or isolated segments (for example, other images in the same frame) for each frame can be retrieved, when making the video stream.

Another embodiment of the invention allows for a film or portion thereof, to be made from a single shoot or take from a single camera. This allows for an overall scene to be shot, with various portions and resolutions (zooms), taken from this single shot, eliminating the need for multiple cameras to shot various portions of a scene from different angles and resolutions, and the equipment and labor costs associated therewith. These portions can then be compiled or recomposed, to make a single film or portions thereof. In particular, this allows editing after the fact, as new shots are not required, but rather, different portions of the film shot can be isolated and ultimately placed into the edited film, as the entire film has already been shot.

An embodiment of the invention is directed to a method for reconfiguring or recomposing large format media. This method includes obtaining processed film shot on a large format camera. The processed film, for example, negatives, positives, internegatives, interpositives or prints, includes at least one frame. At least one target image is selected from the at least one frame, and the at least one target image is isolated. The isolated at least one target image is recomposed into a video stream. The video stream can then be transferred into a standard or conventional media format such as television, digital versatile disc (DVD) and Compact Disc, read-only-memory (CD ROM).

Another embodiment of the invention is directed to a method for reconfiguring or recomposing large format media, that includes obtaining processed film shot on a large format camera. The processed film, for example, negatives, positives, internegatives, interpositives or prints, includes at least one frame. At least one target image is selected from the at least one frame, and the at least one target image is extracted or isolated in the at least one frame. At least one image (for example, a digital image) of the extracted at least one target image is obtained (known as the "obtained image"), and at least a portion of the at least one obtained image of the extracted at least one target image is placed into a video stream. The video stream can then be transferred into a standard or conventional media format such as television, DVD and CD ROM.

Another embodiment of the invention is directed to a method for recomposing large format media, such as, for example, 65 mm or 70 mm film. The method includes obtaining processed film shot on a large format camera, the processed film including at least one frame.

The processed film is then placed into a telecine apparatus (telecine), and instructions are provided to the telecine for operating on (processing) the processed film. These instructions are for selecting at least one target image in the at least one frame, and, extracting the at least one target image from the at least one frame. The process of providing the instructions, typically results from a first or training run of the film (e.g., a negative) in the telecine. This first or training run is typically manual, and if the film is running, it is running at a speed slower than normal (conventional) film playback speed (approximately 24 frames per second).

The film is typically rewound and again moved through the telecine apparatus, typically in a second or processing run, that is typically an automatic process. Movement of the film through the telecine typically includes, operating on the film in accordance with the instructions provided to the telecine, as developed in the first or training run, obtaining an image (for example, a digital image) of the extracted at least one target image, and, placing at least a portion of the obtained image of the at least one target image into a video stream. The video stream may be, for example, a motion picture, television, taped media, or other formatted video stream.

BRIEF DESCRIPTION OF THE DRAWINGS

Attention is now directed to the drawing figures, where like reference numerals and characters indicate corresponding or like components. In the drawings.

DETAILED DESCRIPTION

Figure 1A:
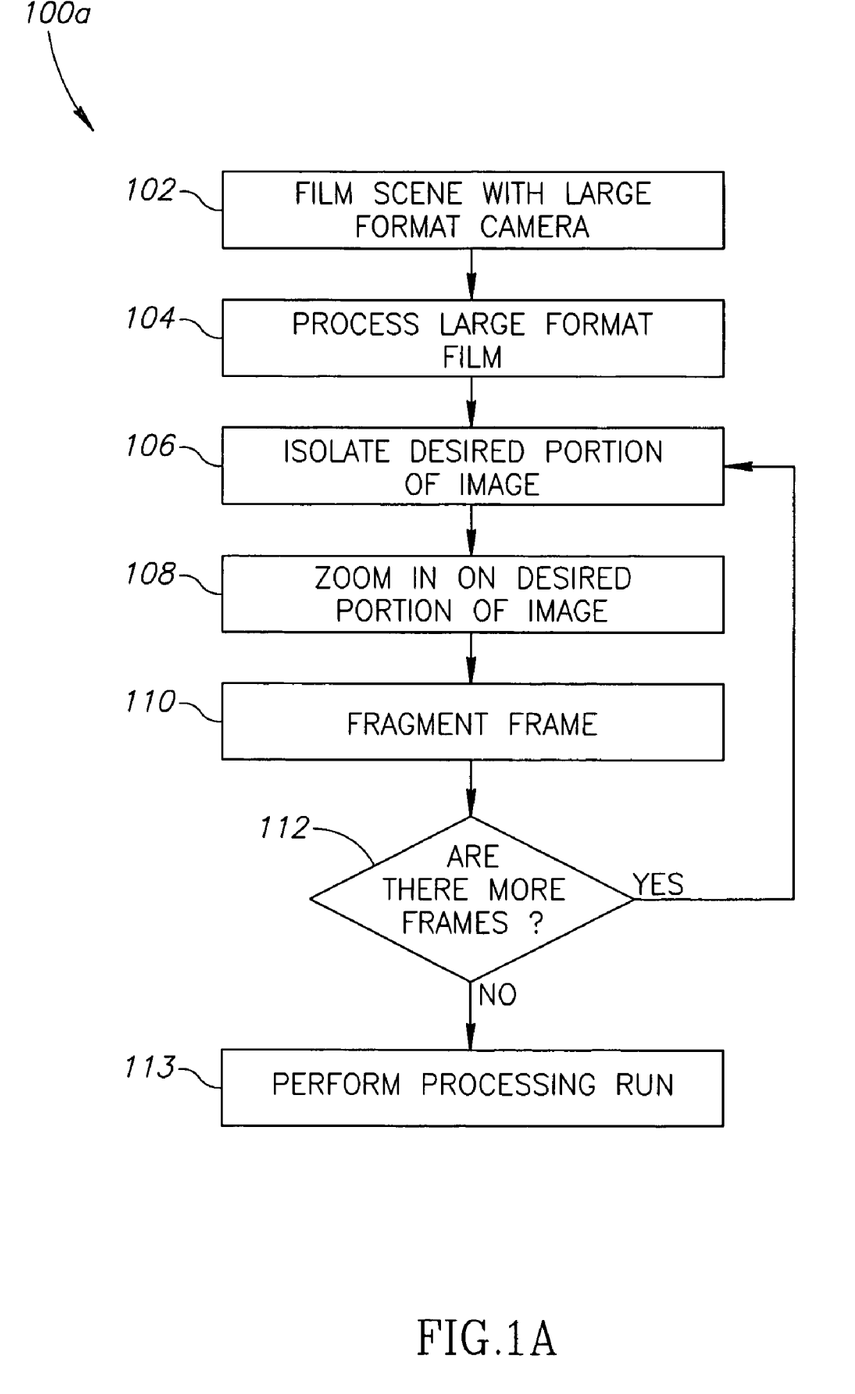
FIGS. 1A and 1B are flow diagrams of processes in accordance with an embodiment of the invention.
Figure 1B:
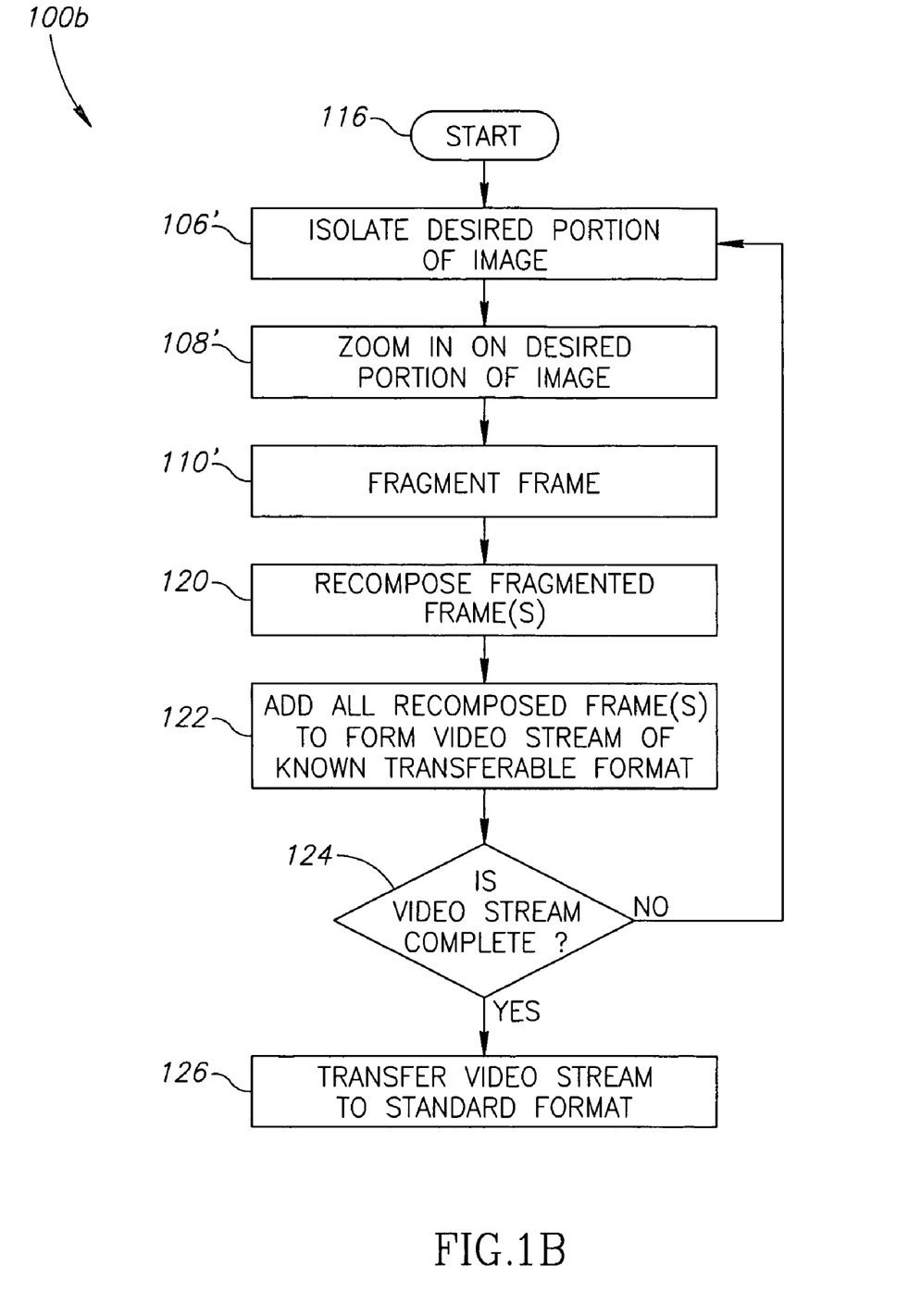

FIG. 1A details an exemplary process 100a that is typically performed in conjunction with the exemplary process 100b of FIG. 1B. The processes 100a, 100b are shown in FIGS. 1A and 1B, respectively, in the form of flow diagrams.

Initially, turning to FIG. 1A, at block 102, the desired scene is shot with a large format camera, such as a motion picture camera that uses 65 mm or other large format film, for example, a 15/70 Camera System from Iwerks® of Burbank, Calif. or an IMAX® camera from IMAX Corporation of Mississauga, Ontario, Canada. This large format camera uses large format film, such as 65 mm/15-perf film stock, or other 65 mm motion picture standard film. Other large format film, such as 65 mm/5-perf, 65 mm/8-perf and 65 mm/10-perf, and other large format media are also suitable for use with the large format cameras and associated systems.

The process moves to block 104, where the large format film is processed, for example, as a negative, such as a 15/70 negative. While a negative is utilized for the example here, as it is a first generation image, the film (large format) can also processed as a positive, internegative, interpositive, or the like and the process of the invention, as described herein, can also be performed on these alternately processed films, similar to that of the exemplary negative (described below).

Alternately, a 70 mm print may be desired, for example, to satisfy IMAX® and other similar large format projection systems. In this case, processing of the 65 mm film, at block 104, would additionally involve printing the negative onto 70 mm film, to create the 70 mm print.

Figure 2A:
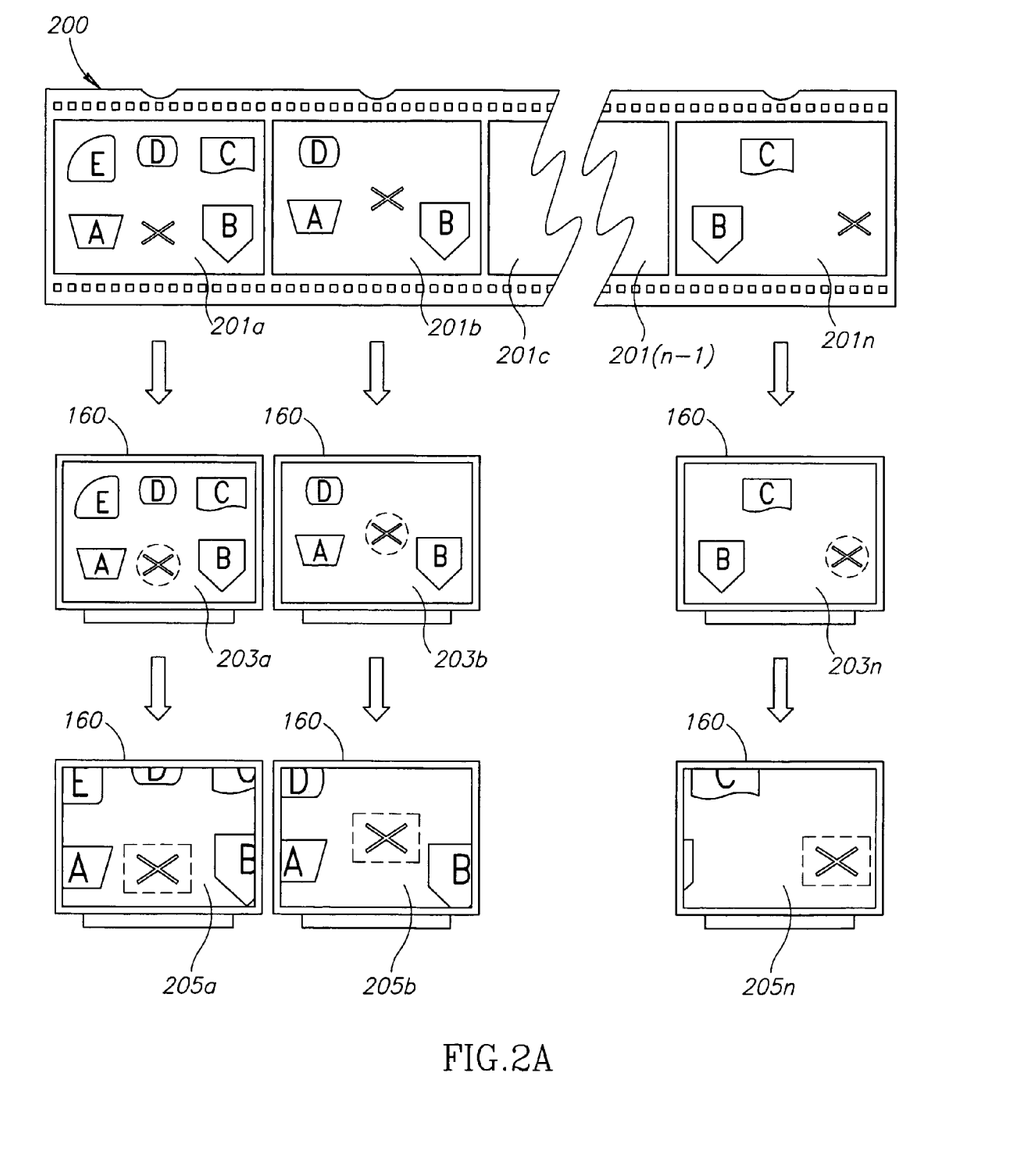
FIGS. 2A and 2B are a diagram illustrating the of the processes of FIGS. 1A and 1B.
Figure 2B:
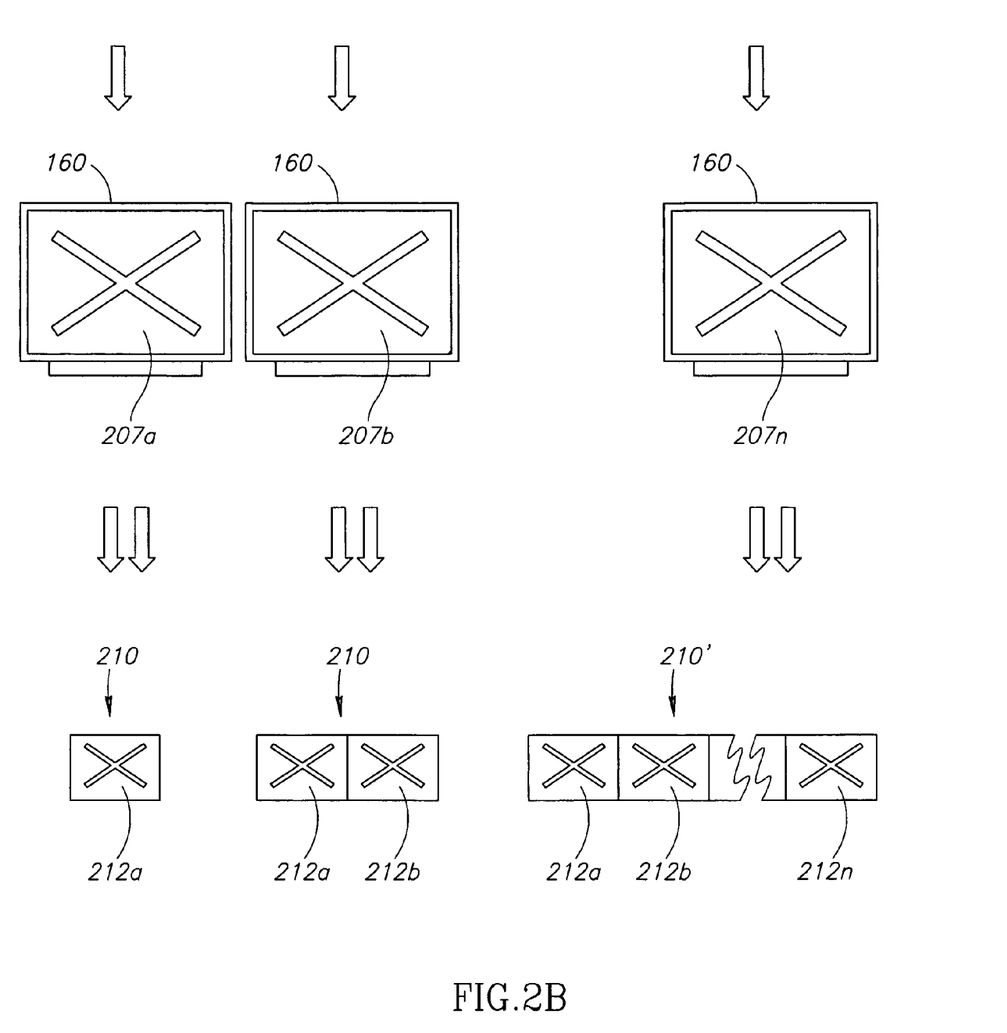

Attention is now also directed to FIGS. 2A and 2B, to illustrate portions of the process of FIGS. 1A and 1B. FIG. 2A shows a developed and processed negative 200 of a filmed scene, for example, where the camera moved in an attempt to follow a subject, or where the camera was still and the subjects moved (the sub process of block 102). The negative 200 is formed of frames 201a-201n. In particular, frame 201a is a first frame, frame 201b is a second frame, to illustrate subsequent frames, and frame 201n is a last frame of the negative 200. Other frames referenced herein are correspondingly sequential with the first 201a, second 201b, and last 201n frames. The progression of the process 100a, as performed on the frames 201a-201n, is indicated by the downward pointing single arrows in FIGS. 2A and 2B.

Figure 3:
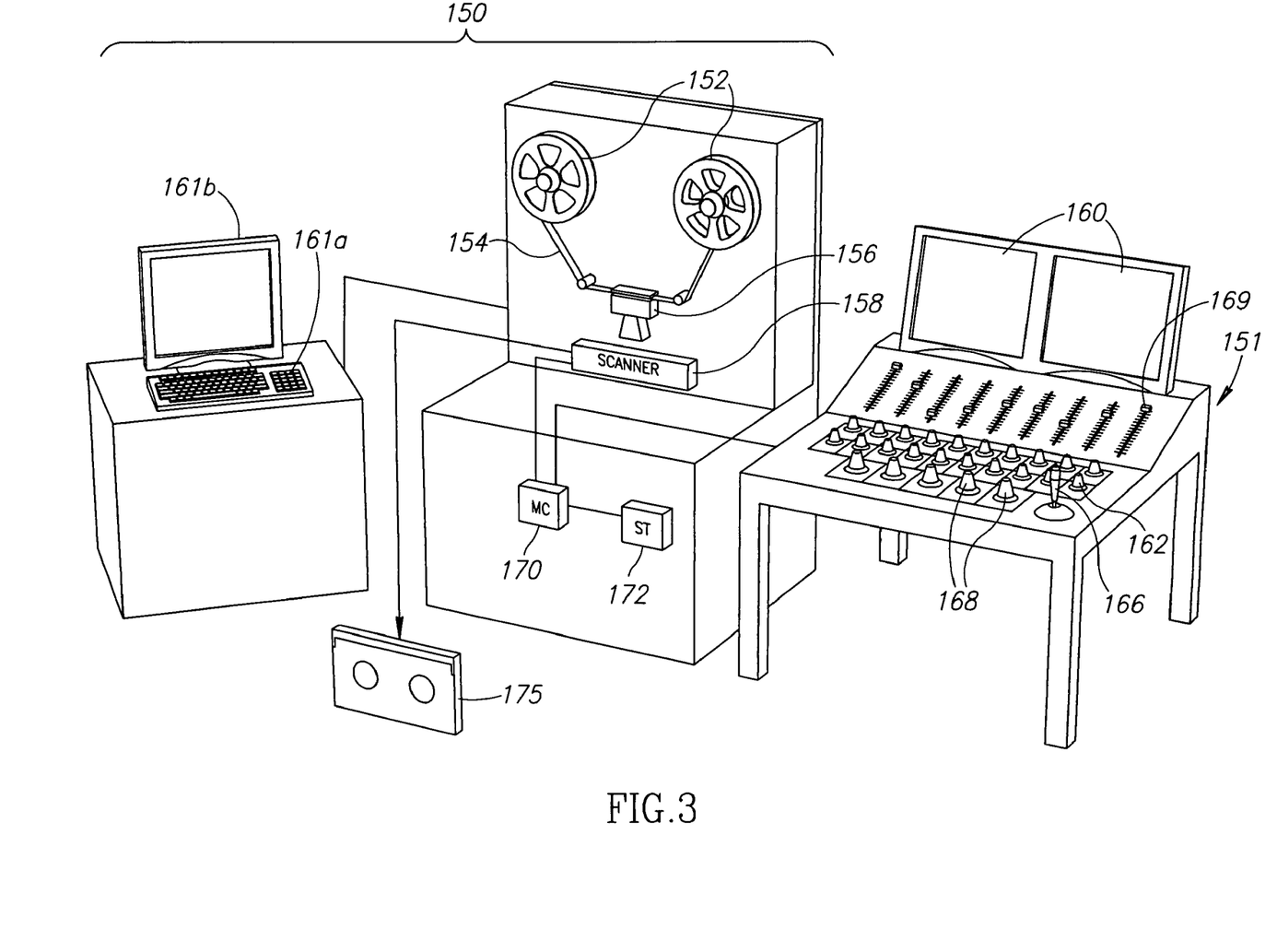
FIG. 3 is a diagram of the equipment used in various embodiments of the invention; and, FIGS. 4A and 4B are a diagram of another process of FIGS. 1A and 1B in accordance with an embodiment of the invention.

The negative 200 is positioned and processed in a film editing and conversion apparatus, for example, a machine commonly known as a telecine 150, coupled with an image processing machine 151, shown, for example, in FIG. 3. A telecine is a machine that converts movie film, normally shot at a frame rate or speed of 24 frames per second, into other frame rates for other media such as television, by adding frames, to increase the frame rate. For example, the frame rate for television is 29.97 frames per second. Telecine is also a process for converting movie film, normally shot at a frame rate or speed of 24 frames per second, into other frame rates for other media such as television, by adding frames, to increase the frame rate.

In FIG. 3, the telecine 150 typically includes take up reels 152 for supporting film 154, that is passed through a gate 156 at various speeds, for example, 24 Frames per second. A scanner 158 sits below the gate 156, for capturing the images of the film 154. The film 154 is viewable on the video monitor 160 of the image processor 151. The telecine 150 also includes a keyboard 161a and monitor 161b, for viewing the conditions of the telecine 150 entering diagnostic commands to the telecine 150.

The editing or processing of the film 154 is done by a worker, commonly known as a colorist, who utilizes the control panel 162 of the image processor 151. The control panel 162, typically includes joysticks 166, trackballs (not shown), knobs 168, keyboards (not shown), and soundboards 169, etc. The telecine 150 is computerized and typically includes a master controller (MC) 170, linked to storage media (ST) 172, for data, digital media, signals, etc. The master controller (MC) 170 is typically processor based, is programmable, and is electronically linked to the scanner 158 and the control panel 162 of the image processor 151.

Exemplary telecine machines suitable for use herein may include the MILLENIUM and MILILLENIUM II film scanning machines, both machines from Cintel International, Ltd., Hertfordshire, UK. The telecine machines, including the MILLENIUM and MILILLENIUM II film scanning machines, typically have been modified, to include a 70 mm gate, suitable for large format film, and for example, both 65 mm and 70 mm. The output from the telecine machines, is typically taped media 175, such as HDCAM 24PSF.

Also, an exemplary image processing machine suitable for use with the above described telecine, is a da Vinci 2K image processor, available from da Vinci, 4397 NW 124$^{th}$ Avenue, Coral Springs, Fla. 33065.

Turning back to FIGS. 1A, and 2A and 2B, the process continues as the negative 200 is placed into the telecine 150. The negative 200 will be subjected to sub processes, blocks 106, 108 and 110, detailed below, that are performed in a first or training run on the telecine 150. During this first or training run, sub processes performed on the negative 200, are converted into instructions, that are executed during the second or processing run, detailed below as the process 100b. The first or training run, where the sub processes of blocks 106, 108 and 110 are performed, these sub processes are typically performed step by step in a manual fashion, frame by frame, or in groups of frames. The first or training run may also be made with the film or negative running at slow speeds, typically below the normal frame rate or speed for motion picture film of 24 frames per second.

The first or training run is illustrated in FIGS. 2A and 2B by the single arrows, that point downward. The negative 200 is viewable through a video monitor 160 of the telecine. Initially, the first frame 201a of the film negative is 200 includes the images X, A, B, C, D and E. For purposes of explanation for this exemplary process, image X will be the desired target.

At block 106, a desired portion of the image is isolated (selected) on the negative 200, as shown in the screen shot 203a, of the frame 201a. In this screen shot 203a, for example, image X has been isolated, as shown in the broken line circle.

The isolated (selected) image is now zoomed in on, at block 108, as shown in the screen shot 205a, of the frame 201a, as seen through the video monitor 160 of the telecine. This zooming is performed, so that the image, here X, remains focused. The now enlarged X, at a high focus is shown in the broken line box in the screen shot 205a. The focusing while zooming, coupled with using processed high resolution film, here, for example, the negative from film shot on a large format motion picture camera, maintains the high resolution. The resultant focus/zoom-in of the negative is typically broadcast quality resolution.

The frame 201a is then fragmented at block 110. This fragmentation is such that the image, here, the X, is isolated and moved to the desired position, as it will appear in its new frame, for example, frame 212a of the video stream 210 (and the resultant video stream 210'), as seen in the screen shot 207a on the video monitor 160.

The process moves to block 112, where it is determined if more frames of the negative 200 need to be processed. Here, frames 201b-201n need to be processed. Accordingly, for each frame 201b-201n, in sequence, the process returns to block 106. Processing for frames 210b-201n is similar to that for frame 201a, and all sub processes, of blocks 106, 108 and 110 for frames 201b-201n are identical to those of blocks 106, 108 and 110, as performed on frame 201a. As with frame 201a, the target in frames 201b-201n is the X.

As stated above, the sub processes of blocks 106, 108 and 110, as performed on all frames 201a-201n of the negative 200 are typically performed in the first, or "training" run on the telecine. The instructions for the sub processes of blocks 106, 108 and 110, developed during the training run, are sent to the master controller (MC) 170 of the telecine 160, and may be stored in the storage media (ST) 172. The master controller (MC) 170 will then instruct the scanner to perform the sub processes of blocks 106, 108 and 110 on each frame, when the second run of the film 200 is made on the telecine 160, as detailed below.

With all of the frames 201a-201n of the negative 200 processed into instructions, a second run is now performed on the negative 200, in accordance with block 113. The film, that includes the negative 200, is rewound in the telecine 150, and the second or processing run, of the process 100b, may begin.

Attention is now directed to FIG. 1B, showing the second or processing run 100b, of the exemplary process. The process of the second or processing run 100b begins at the START at block 116. During this processing or second run, the processing instructions developed for all of the frames 201a-201n of the negative 200, as well as the other sub processes for the process 100b, are performed on the negative 200, typically in real time, as it moves through the telecine, typically at the speed for motion picture file, for example, 24 frames per second. The progression of the process 100b, typically the second or processing run, as performed on the frames 201a-201n, is indicated by the downward pointing single arrows and (plus) the downward pointing double (paired) arrows in FIGS. 2A and 2B. In this second or processing run, the negative 200 is converted into a video stream.

Throughout this document, the reference numeral 100a is used interchangeably with the process, including at least the sub processes of blocks 102, 104, 106, 108 and 110, and the first or training run. Similarly, the reference numeral 100b is used interchangeably with the process, including at least the sub processes of blocks 116, 106', 108', 110', 120 and 122, and the second or processing run.

While a first process 100a has been shown, blocks 102 and 104 from this process (as shown in FIG. 1A) may be substituted for block 116 (of the processing run 100b), and the process may include only the processing run 100b.

In block 116, the instructions developed in the process 100a (from the sub processes of blocks 106, 108 and 110) are activated. This second or processing run includes sub processes similar to those in the first or processing run 100a, except that these sub processes are performed automatically by the telecine, in accordance with the operations programmed into the telecine for each sub process on each frame 201a-201n of the negative 200. Accordingly, the sub processes of blocks 106, 108 and 110 in the first or training run 100a, that are typically performed manually, are indicated as blocks 106', 108' and 110' respectively, as these sub processes are similar (as indicated by the "prime" symbol after the numerals), but typically performed automatically in the second or processing run 100b. Additionally, the sub processes of blocks 120 and 122 are typically also performed automatically with the sub processes of blocks 106', 108' and 110'.

The negative 200, now running through the telecine, is typically processed in frames and sequentially. For example, the first frame, 201a, is processed, and its processing will now be detailed, as exemplary of the other frames 201b-201n of the negative 200. In this second or processing run, the negative 200 is viewable through a video monitor 160 of the telecine.

The process moves to block 106', where a desired portion of the image is isolated (selected) on the negative 200, as shown in the screen shot 203a (on the video monitor 160 of the telecine 150), of the frame 201a. In this screen shot 203a, for example, image X has been isolated, as shown in the broken line circle.

The isolated (selected) image is now zoomed in on, at block 108', as shown in the screen shot 205a, of the frame 201a, as seen through the video monitor 160 of the telecine. This zooming is performed, so that the image, here X, remains focused. The now enlarged X, at a high focus is shown in the broken line box in the screen shot 205a. The focusing while zooming, coupled with using processed high resolution film, here, for example, the negative from film shot on a large format motion picture camera, maintains the high resolution. The resultant focus/zoom-in of the negative is typically broadcast quality resolution.

The frame 201a is then fragmented at block 110'. This fragmentation is such that the target image, here, the X, is isolated and moved to the desired position, as it will appear when it is recomposed in its new frame, for example, frame 212a of the video stream 210 (and the resultant video stream 210'). The target image (the X) is in accordance with the image, that is seen in the screen shot 207a on the video monitor 160.

Recomposing of the fragment frame occurs at block 120, as a digital image, or data corresponding thereto, as per the screen shot 207a, is taken from the frame 201a of the negative 200. During recomposition, the isolated and positioned X, is extracted from its respective frame 201a-201n, for placement into a video stream.

The now recomposed frame, is then placed (added) into a video stream 210, at block 122. The recomposed image X, forms a portion of the video stream 210, for example, the frame 212a. As frame 212a is the first frame of the video stream, it will be the first frame of the sequence of frames that form the video stream 210.

The process moves to block 124, where it is determined if the video stream 210 is complete. If the video stream 210 is not complete, the process returns to block 106'. In this exemplary operation, the second frame 201b, with image X, the target image, amongst images A, B and D, is now be recomposed in accordance with blocks 106', 108', 110', 120 and 122. This recomposing is similar to that which was performed on the first frame 201a, but instead is performed on the second frame 201b. The frames 201b to 201n are subjected to all of the sub processes, as performed on the frame 201a, and the sub processes are seen in the corresponding screen shots 203b, 205b, 207b, 203n, 205n, 207n, on the video monitor 160, corresponding to screen shots frames 203a, 205a and 207a, respectively, as seen through the video monitor 160.

The sub processes of blocks 106', 108', 110', 120 and 122 are performed on the second, and subsequent frames. The sub process of block 120 is different for each frame 201a-201n, as the recomposed image X (through frame 212n) (originally from frames 201b-201n, respectively) is added to the video stream 210 in frames 212b-212n, in a sequentially cumulative manner. Accordingly, the video stream 210 becomes longer, as more frames, to the end frame 212n are added, as each frame of the negative 200 is processed. The resultant video stream 210', for example, includes frames 212a-212n. In all instances where the video stream 210, resulting in the resultant video stream 210' being made, the telecine is programmed to create the frames 212a-212n, suitable for playback at the normal speeds and frame rates of the desired media, such as, for example, television, motion picture, taped media, and the like.

With the video stream now complete at block 124, the process moves to block 126. In the sub process of block 126, the resultant video stream 210', with images X, referenced as 212a-212n, is transferred to standard or conventional formats. In the case of videotape video streams or digital video streams, these standard or conventional formats, to which the transfer is made, may be, for example, television, Digital Versatile Disc (DVD), CD ROM, and other conventional films and media.

During this second or processing run, the film (the negative) 200 is run at its normal speed or frame rate, for example, 24 frames per second (as conventional for motion picture film). The sub processes of blocks 106', 108', 110', 120, and 122 are performed for all of the frames 201a-201n, with the film (negative 200), running at the desired speed or frame rate. Additionally, the scanner 158 of the telecine 150 is adjusted (either manually or automatically by programming the master controller (MC) 170), such that the resultant video stream 210' is fluid and smooth, and lacks distortions between frames, similar to that of motion picture film. While adjustment of the scanner 158 is typically made during the first or training run, it may also be made, by the scanner being programmed, just prior to the second or processing run.

The sub processes of blocks 106, 108, 110, 106', 108', 110', 120, and 122, as stated above, are typically performed in the telecine, as combined with the image processing machine. Both machines are detailed above.

Alternately, the subprocesses of blocks 106, 108, 110, 106', 108', 110', 120 and 122, can be performed with digital apparatus, such as high resolution film scanning equipment, from, for example, 2K up to 8K. This digital apparatus typically also includes the aforementioned video monitor. The output is typically digital data, such as a digital video stream in a hard drive, for example, a Tagged Image File Format (TIFF) file.

Figure 4A:
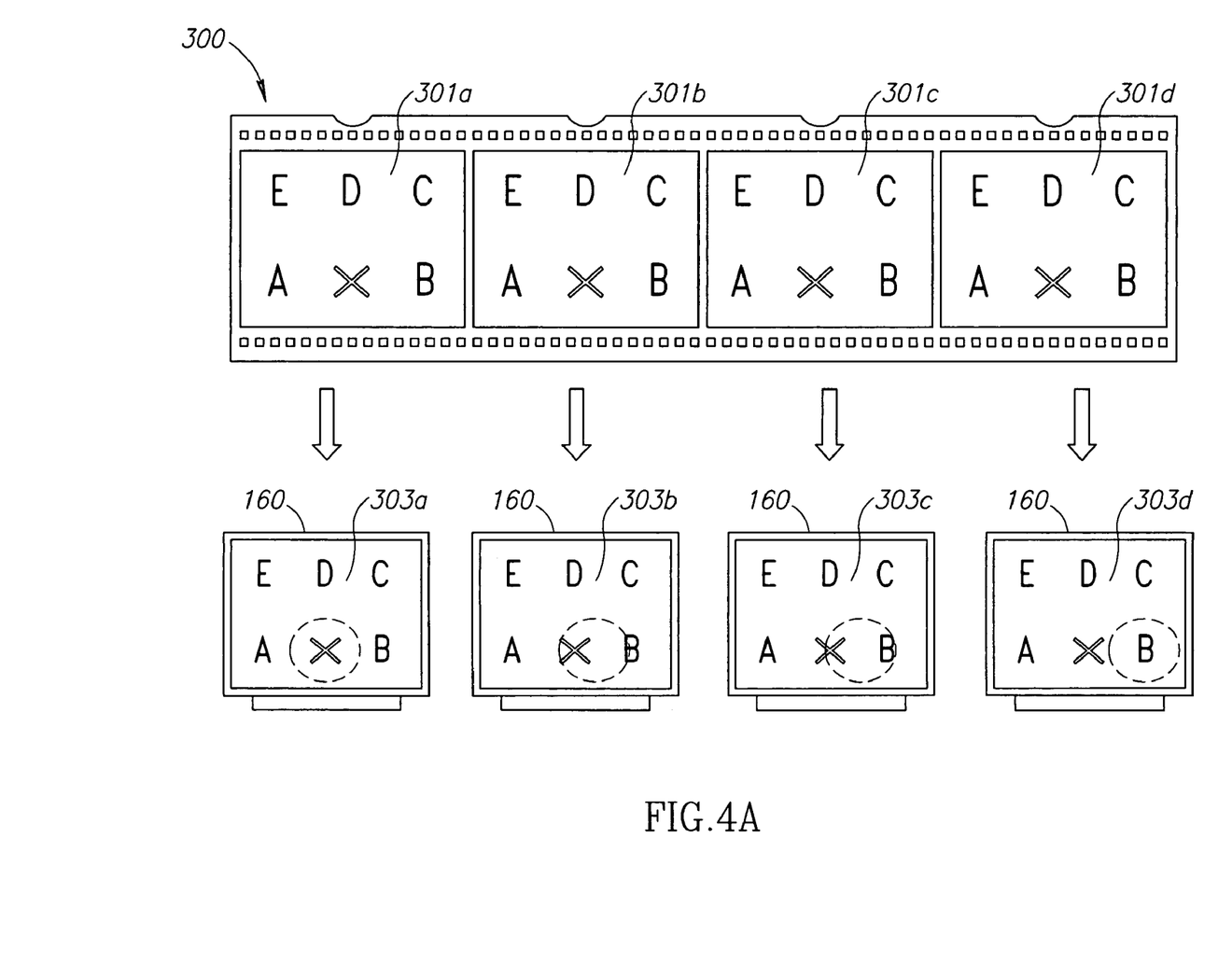
Figure 4B:
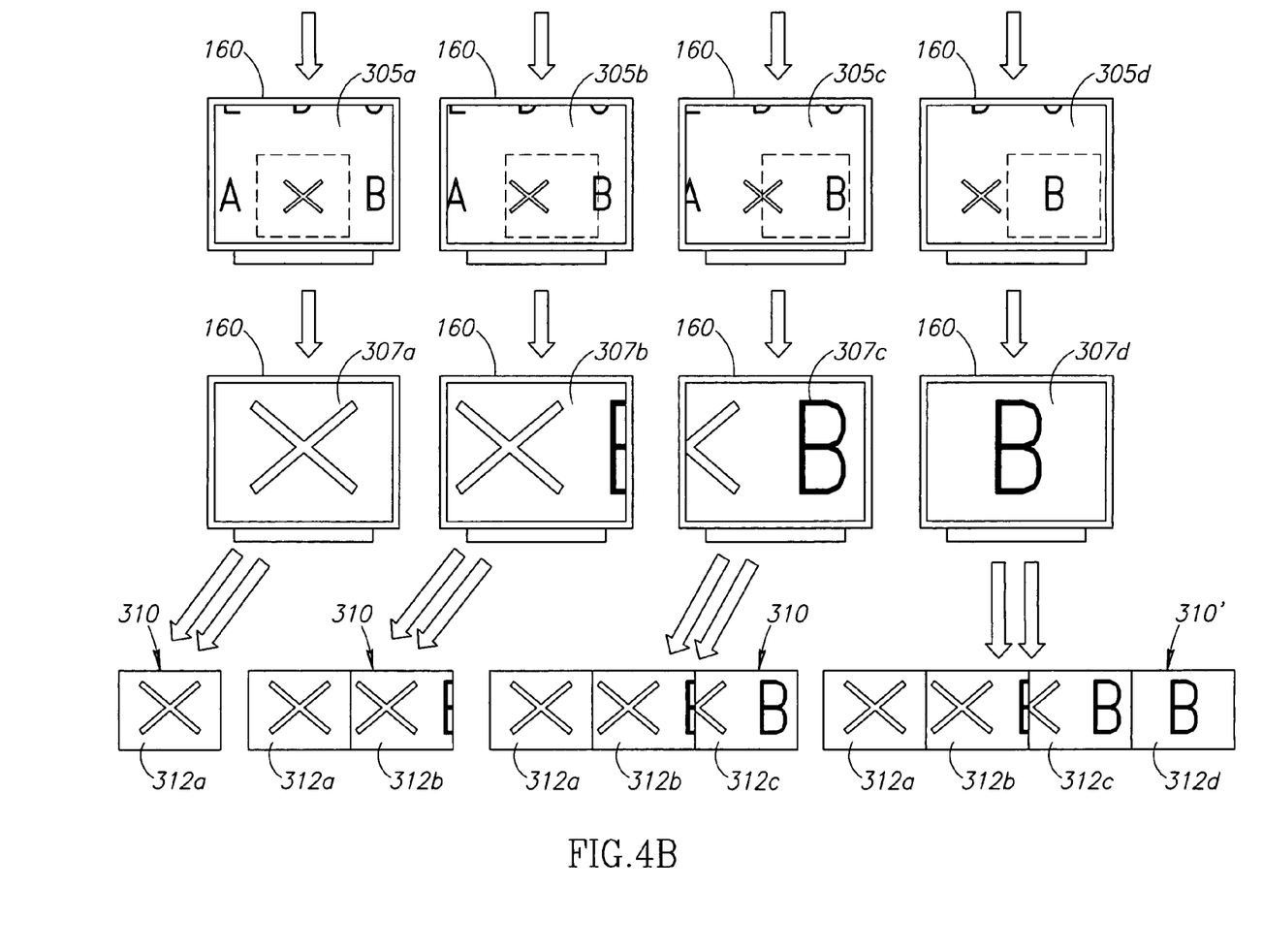

Attention is now also directed to FIGS. 4A and 4B, as well as FIGS. 1A and 1B, to illustrate another embodiment of the invention. At block 102, the desired scene has been filmed with a large format camera that is stationary. The film is processed at block 104, into a negative 300, as shown in FIG. 4A.

The negative 300 is formed of frames 301a-301d. In particular, frame 301a is a first frame, frames 301b and 301c, are second and third frames, to illustrate subsequent frames, and frame 301d is a last frame of the negative 300. The first frame 301a, as per the process 100a, 100b of the invention, will now be discussed.

The progression of the process 100a, corresponding to the first or training run, as performed on the frames 301a-301d (of the negative 300), is indicated by the downward pointing single arrows in FIGS. 4A and 4B. The progression of the process 100b, corresponding to the second or processing run, as performed on the frames 301a-301d (of the negative 300), is indicated by the downward pointing single arrows and (plus) the downward pointing double (paired) arrows in FIGS. 4A and 4B. The processes, process 100a of the first or training run, and process 100b, of the second or processing run for the negative 300, are similar to the respective processes 100a, 100b, the first or training run, and the second or processing run, respectively, performed on the negative 200 (as shown in FIGS. 2A and 2B and detailed above), with any differences indicated below.

Initially, all of the frames 301a-301d include the images X, A, B, C, D and E. For purposes of explanation for this exemplary process, the image moving from X to B will be the desired target. The negative 300 is then positioned, in a film editing and conversion apparatus, for example, a machine telecine machine in accordance with that described above, including the modification with the gate 156 (FIG. 3), as described above. The negative 300 is viewable through a video monitor 160 associated with the telecine, as detailed above.

The negative is now subjected to a first, or training run, as detailed above. At block 106, a desired portion of the image is isolated (selected) on the negative 300, as shown in the screen shot 303a, of the frame 301a. In this screen shot 303a, for example, image X has been isolated, as shown in the broken line circle.

The isolated (selected) image is now zoomed in on, at block 108, as shown in the screen shot 305a, of the frame 301a, as seen through the video monitor 160 of the Telecine. This zooming is performed, so that the image, here X, remains focused. The now enlarged X, at a high focus is shown in the broken line box in the screen shot 305a. The focusing while zooming, coupled with using processed high resolution film, here, for example, the negative from film shot on a large format motion picture camera, maintains the high resolution. The resultant focus/zoom-in of the negative is typically broadcast quality resolution.

The frame 301a is then fragmented at block 110. This fragmentation is such that the image, here, the X (the target), is isolated, and moved to the desired position, in accordance with the image, as seen in the screen shot 307a on the video monitor 160.

The processing operations of the sub processes, of blocks 106, 108 and 110, are converted to instructions, that are stored in the telecine. The process now moves to block 112, where it is determined if there are more frames of the negative 300, to be processed. As frames 301b-301d, need to be processed in this training run to be converted into instructions, the process returns to block 106, where the second frame 301b, is the subject of the first or training run.

In block 106, frame 301b of the negative is now being edited, as the broken line circle, enclosing the target image, is moving to the right, to provide a panning effect in the resultant video stream 310 (shown below). The image within the target (the broken line circle) includes a portion of the X, as shown in the screen shot 303b of the video monitor 160 of the telecine.

The isolated (selected) image is now zoomed in on, at block 108, as shown in the screen shot 305b, of the frame 301b, as seen through the video monitor 160 of the Telecine. This zooming is performed, so that the image of the target, in the broken line box, corresponding to the broken line circle, remains focused. The now enlarged target image, at a high focus, is shown in the broken line box in the screen shot 305b.

The frame 301b is then fragmented at block 110. This fragmentation is such that the image, here, the target, is isolated, and moved to the desired position, in accordance with the image, as seen in the screen shot 307b on the video monitor 160.

The processing operations of the sub processes, of blocks 106, 108 and 110, are converted to instructions, that are stored in the telecine. The process now moves to block 112, where it is determined if there are more frames of the negative 300, to be processed. As frames 301c and 301d, need to be processed in this training run to be converted into instructions, the process returns to block 106, where the third frame 301c, is the subject of the first or training run.

In block 106, frame 301c of the negative is now being edited, as the broken line circle, enclosing the target image, continues moving to the right, to provide a panning effect in the resultant video stream 310 (shown below). The image within the target (the broken line circle) includes a portion of the X and the B, as shown in the screen shot 303c of the video monitor 160 of the telecine.

The isolated (selected) image is now zoomed in on, at block 108, as shown in the screen shot 305c, of the frame 301c, as seen through the video monitor 160 of the telecine. This zooming is performed, so that the image of the target, in the broken line box, corresponding to the broken line circle, remains focused. The now enlarged target image, at a high focus, is shown in the broken line box in the screen shot 305c.

The frame 301c is then fragmented at block 110. This fragmentation is such that the image, here, the target, is isolated, and moved to the desired position, in accordance with the image, as seen in the screen shot 307c on the video monitor 160.

The processing operations of the sub processes, of blocks 106, 108 and 110, are converted to instructions, that are stored in the telecine. The process now moves to block 112, where it is determined if there are more frames of the negative 300, to be processed. As frame 301d needs to be processed in this training run to be converted into instructions, the process returns to block 106, where the fourth frame 301d, is the subject of the first or training run.

In block 106, frame 301d of the negative is now being edited, as the broken line circle, enclosing the target image, continues moving to the right, to provide a panning effect in the resultant video stream 310 (shown below). The image within the target (the broken line circle) includes the B, as shown in the screen shot 303d of the video monitor 160 of the telecine.

The isolated (selected) image is now zoomed in on, at block 108, as shown in the screen shot 305d, of the frame 301d, as seen through the video monitor 160 of the telecine. This zooming is performed, so that the image of the target, in the broken line box, corresponding to the broken line circle, remains focused. The now enlarged target image, at a high focus, is shown in the broken line box in the screen shot 305d.

The frame 301d is then fragmented at block 110. This fragmentation is such that the image, here, the target, is isolated, and moved to the desired position, in accordance with the image, as seen in the screen shot 307d on the video monitor 160

The processing operations of the sub processes, of blocks 106, 108 and 110, are converted to instructions, that are stored in the telecine. The process now moves to block 112, where there are not any more frames to be processed. With all of the frames 301a-301d of the negative 300 processed into instructions, a second or processing run (process 100b) is now performed on the negative 300, in accordance with block 113. The film, that includes the negative 300, is rewound in the telecine 150, and the second or processing run may begin.

Attention is now directed to FIG. 1B, showing the second or processing run, of the exemplary process 100b, on the negative 300, of FIGS. 4A and 4B. The process 100b (of the second or processing run) begins at the START at block 116.

In block 116, the instructions developed in the process 100a (from the sub processes of blocks 106, 108 and 110) for the frames 301a-301d are activated. This second or processing run includes sub processes similar to those in the first or processing run 100a, except that these sub processes, along with the sub processes of blocks 120 and 122, are performed automatically by the telecine, in accordance with the operations programmed into the telecine for each sub process on each frame 301a-301d of the negative 300. Accordingly, the sub processes of blocks 106, 108 and 110 in the first or training run 100a, that are typically performed manually (or at low film speed, as detailed above), are indicated as blocks 106', 108' and 110' respectively, as these sub processes are similar (as indicated by the "prime" symbol after the numerals), but performed automatically in the process 100b of the second or processing run.

The negative 300, now running through the telecine, is typically processed in frames and sequentially. For example, the first frame, 301a, is processed, in the second or processing run. Like the process 100a, the negative 300 is viewable through a video monitor 160 of the telecine.

The process moves to block 106', where a desired portion of the image is isolated (selected) on the negative 300, as shown in the screen shot 303a (on the video monitor 160 of the telecine 150), of the frame 301a. In this screen shot 303a, for example, image X has been isolated, as shown in the broken line circle.

The isolated (selected) image is now zoomed in on, at block 108', as shown in the screen shot 305a, of the frame 301a, as seen through the video monitor 160 of the telecine. This zooming is performed, so that the image, here X, remains focused. The now enlarged X, at a high focus is shown in the broken line box in the screen shot 305a. The focusing while zooming, coupled with using processed high resolution film, here, for example, the negative from film shot on a large format motion picture camera, maintains the high resolution. The resultant focus/zoom-in of the negative is typically broadcast quality resolution.

The frame 301a is then fragmented at block 110'. This fragmentation is such that the target image, here, the X, is isolated, and moved to the desired position, as it will appear when it is recomposed in its new frame, for example, frame 312a of the video stream 310 (and the resultant video stream 310'). The target image (the X) is in accordance with the image, as seen in the screen shot 307a on the video monitor 160.

Recomposing of the fragment frame occurs at block 120, as a digital image, or data corresponding thereto, as per the screen shot 307a, is taken from the frame 301a of the negative 300. During recomposition, the isolated and positioned X, is extracted from its frame 301a, for placement into a video stream.

The now recomposed frame, is then placed (added) into a video stream 310, at block 122. The recomposed image X, forms a portion of the video stream 310, for example, the frame 312a. As frame 312a is the first frame of the video stream, it will be the first frame of the sequence of frames that form the video stream 310.

The process moves to block 124, where it is determined if the video stream 310 is complete. If the video stream 310 is not complete, the process returns to block 106'. Here, subsequent frames 301b-301d require processing in this second or processing run, so the process returns to block 106'.

The process returns to block 106', for operation on the second frame 301b of the negative 300. A desired portion of the image, here, the target image within the broken line circle, the X and a portion of the B, are isolated (selected) from the frame 301b on the negative 300. This is shown in the screen shot 303b (on the video monitor 160 of the telecine 150). In isolating the X and portion of the B within the target, the broken line circle, this provides the effect of the camera panning laterally in the resultant video stream 310', as detailed below.

The isolated (selected) image is now zoomed in on, at block 108', as shown in the screen shot 305b, of the frame 301b, as seen through the video monitor 160 of the telecine. This zooming is performed, so that the image, here X with a portion of the B, remains focused. The now enlarged X and portion of the B, at a high focus, is shown in the broken line box in the screen shot 305b. The focusing while zooming, coupled with using processed high resolution film, here, for example, the negative from film shot on a large format motion picture camera, maintains the high resolution. The resultant focus/zoom-in of the negative is typically broadcast quality resolution.

The frame 301b is then fragmented at block 110'. This fragmentation is such that the target image, here, the X and the portion of the B, is isolated and moved to the desired position, as it will appear when it is recomposed in its new frame, for example, frame 312b of the video stream 310 (and the resultant video stream 310'). The target image is in accordance with the image, as seen in the screen shot 307a on the video monitor 160.

Recomposing of the fragment frame occurs at block 120, as a digital image, or data corresponding thereto, as per the screen shot 307b, is taken from the frame 301b of the negative 300. During recomposition, the isolated and positioned X and portion of the B, is extracted from its frame 301b, for placement into a video stream.

The now recomposed frame, is then placed (added) into a video stream 310, at block 122. The recomposed image X and portion of the B, forms a portion of the video stream 310, for example, the frame 312b. As frame 312b is the second frame of the video stream, it is joined with frame 312a, in the sequence of frames that form the video stream 310.

The process moves to block 124, where it is determined if the video stream 310 is complete. If the video stream 310 is not complete, the process returns to block 106'. Here, subsequent frames 301c and 301d require processing in this second or processing run, so the process returns to block 106'.

The process returns to block 106', for operation on the third frame 301c of the negative 300. A desired portion of the image, here, the target image within the broken line circle, the portion of the X and the B, are isolated (selected) from the frame 301c on the negative 300. This is shown in the screen shot 303c (on the video monitor 160 of the telecine 150). In isolating the portion of the X and the B within the target, the broken line circle, this provides the continued effect of the camera panning laterally in the resultant video stream 310', as detailed below.

The isolated (selected) image is now zoomed in on, at block 108', as shown in the screen shot 305c, of the frame 301c, as seen through the video monitor 160 of the telecine. This zooming is performed, so that the image, here the portion of the X and the B, remains focused. The now enlarged portion of the X and the B, at a high focus, is shown in the broken line box in the screen shot 305c. The focusing while zooming, coupled with using processed high resolution film, here, for example, the negative from film shot on a large format motion picture camera, maintains the high resolution. The resultant focus/zoom-in of the negative is typically broadcast quality resolution.

The frame 301c is then fragmented at block 110'. This fragmentation is such that the target image, here, the portion of the X and the B, is isolated and moved to the desired position, as it will appear when it is recomposed in its new frame, for example, frame 312c of the video stream 310 (and the resultant video stream 310'). The target image is in accordance with the image, as seen in the screen shot 307c on the video monitor 160.

Recomposing of the fragment frame occurs at block 120, as a digital image, or data corresponding thereto, as per the screen shot 307c, is taken from the frame 301c of the negative 300. During recomposition, the isolated and positioned portion of the X and the B, is extracted from its frame 301c, for placement into a video stream.

The now recomposed frame, is then placed (added) into a video stream 310, at block 122. The recomposed image, formed of the portion of the X and the B, forms a portion of the video stream 310, for example, the frame 312c. As frame 312c is the third frame of the video stream, it is joined with frames 312a and 312b, in the sequence of frames that form the video stream 310.

The process moves to block 124, where it is determined if the video stream 310 is complete. If the video stream 310 is not complete, the process returns to block 106'. Here, subsequent frame 301d requires processing in this second or processing run, so the process returns to block 106'.

The process returns to block 106', for operation on the fourth and last frame 301d of the negative 300. A desired portion of the image, here, the target image within the broken line circle, the B, is isolated (selected) from the frame 301d on the negative 300. This is shown in the screen shot 303d (on the video monitor 160 of the telecine 150). In isolating the B within the target, the broken line circle, this provides the completed effect of the camera panning laterally in the resultant video stream 310', as detailed below.

The isolated (selected) image is now zoomed in on, at block 108', as shown in the screen shot 305d, of the frame 301d, as seen through the video monitor 160 of the telecine. This zooming is performed, so that the image, here the B, remains focused. The now enlarged B, at a high focus, is shown in the broken line box in the screen shot 305d. The focusing while zooming, coupled with using processed high resolution film, here, for example, the negative from film shot on a large format motion picture camera, maintains the high resolution. The resultant focus/zoom-in of the negative is typically broadcast quality resolution.

The frame 301d is then fragmented at block 110'. This fragmentation is such that the target image, here, the B, is isolated and moved to the desired position, as it will appear when it is recomposed in its new frame, for example, frame 312d of the video stream 310 (and the resultant video stream 310'). The target image is in accordance with the image, as seen in the screen shot 307d on the video monitor 160.

Recomposing of the fragment frame occurs at block 120, as a digital image, or data corresponding thereto, as per the screen shot 307d, is taken from the frame 301d of the negative 300. During recomposition, the isolated and positioned image, B, is extracted from its frame 301d, for placement into the video stream.

The now recomposed frame, is then placed (added) into a video stream 310, at block 122. The recomposed image, formed of the B, forms a portion of the video stream 310, for example, the frame 312d. As frame 312d is the fourth and final frame of the video stream, it is joined with frames 312a, 312b and 312c, in the sequence of frames that form the resultant video stream 310'. In all instances where the video stream 310, resulting in the resultant video stream 310' being made, the telecine is programmed to create the frames 312a-312d, suitable for playback at the normal speeds and frame rates of the desired media, such as television, motion picture, taped media, and the like.

Similar to the process of image recomposition performed on the negative 200, detailed above, the negative 300 is subjected to the aforementioned sub processes of blocks 106, 108, 110, 106', 108', 110', 120, and 122, that are also typically performed in the telecine. As stated above, the telecine is typically combined with the image processing machine, as detailed above.

The process moves to block 124, where it is determined if the video stream 310 is complete. The video stream is now complete, as the resultant video stream 310' has been formed. Accordingly, the process moves to block 126.

At block 126, the resultant video stream 310', formed of frames 312a-312d, is transferred to standard or conventional formats. In the case of videotape video streams or digital video streams, these standard or conventional formats, to which the transfer is made, can be, for example, television, Digital Versatile Disc (DVD), CD ROM, and other conventional films and media.

The above-described processes, including portions thereof, can be performed by software, hardware and combinations thereof. These processes and portions thereof can be performed by computers, computer-type devices, workstations, processors, micro-processors, other electronic searching tools and memory and other storage-type devices associated therewith. The processes and portions thereof can also be embodied in programmable storage devices, for example, compact discs (CDs) or other discs including magnetic, optical, etc., readable by a machine or the like, or other computer usable storage media, including magnetic, optical, or semiconductor storage, or other source of electronic signals.

There have been shown and described preferred embodiments of a method for recomposing large format media. These embodiments can be performed by hardware, software or combinations of hardware and software. It is apparent to those skilled in the art, however, that many changes, variations, modifications, and other uses and applications for the method and its component or sub processes, are possible, and also such changes, variations, modifications, and other uses and applications which do not depart from the spirit and scope of the invention are deemed to be covered by the invention, which is limited only by the claims which follow.

What is claimed is:

1. A method for reconfiguring large format media comprising:
    selecting at least one target image from at least one frame of large format processed motion picture film, the film comprising a sequence of frames for a filmed shot;
    isolating the at least one target image;
    extracting the at least one target image from the film; and
    positioning the extracted image in a video stream having a sequence of images configured as another shot.

2. The method of claim 1 wherein isolating the at least one target image comprises zooming in on the target image while maintaining a focus thereon.

3. The method of claim 2 wherein extracting comprises obtaining an image of the isolated at least one target image, and the method further comprises placing at least a portion of the obtained image in the video stream.

4. The method of claim 1 wherein the film comprises a negative.

5. The method of claim 1 further comprising selecting the film from a group consisting of a negative, a positive, an internegative, an interpositive, and a print.

6. The method of claim 1 further comprising selecting the film from a group consisting of 65 mm film and 70 mm film.

7. The method of claim 1 further comprising transferring the video stream into a media format.

8. A method for reconfiguring large format media comprising:
    selecting at least one target image in at least one frame of large format processed motion picture film, the film comprising a sequence of frames for a filmed shot;
    extracting target image data for the at least one target image from the at least one frame; and
    placing at least a portion of the extracted target image data in a video stream having image data for a sequence of images configured as another shot.

9. The method of claim 8 further comprising zooming in on the at least one target image while focusing on the at least one target image.

10. The method of claim 8 further comprising identifying a position for the target image data for the video stream and placing the target image data at the position for the video stream.

11. The method of claim 8 wherein the film comprises a negative.

12. The method of claim 8 further comprising selecting the film from a group consisting of a negative, a positive, an internegative, an interpositive, and a print.

13. The method of claim 8 further comprising selecting the film from a group consisting of 65 mm film and 70 mm film.

14. The method of claim 8 further comprising transferring the video stream into a media format.

15. A method for recomposing large format media comprising:
providing instructions to a telecine apparatus for operating on large format processed motion picture film comprising a sequence of frames for a filmed shot, the instructions comprising:
selecting at least one target image in at least one frame of the film; and
fragmenting the at least one target image from the at least one frame; and
operating on the film in accordance with the instructions provided to the telecine apparatus comprising:
extracting the fragmented target image; and
placing at least a portion of the extracted target image in a video stream having a sequence of images configured as another shot.

16. The method of claim 15 wherein operating on the film further comprises zooming in on the at least one target image while focusing on the at least one target image.

17. The method of claim 15 further comprising identifying a position for the at least one portion of the extracted target image for the video stream and placing the at least the portion of the extracted target image at the position in the video stream.

18. The method of claim 15 further comprising selecting the film from a group consisting of a negative, a positive, an internegative, an interpositive, and a print.

19. The method of claim 15 wherein operating on the film comprises moving the film at approximately 24 frames per second.

20. The method of claim 15 further comprising providing the instructions in a first run.

21. The method of claim 20 further comprising performing the first run manually.

22. The method of claim 15 further comprising operating on the film in a second run subsequent to the first run.

23. The method of claim 15 further comprising performing the second run automatically.

24. The method of claim 1 further comprising:
selecting a plurality of target images from the film;
isolating the plurality of target images;
extracting the plurality of target images from the film; and
positioning the plurality of target images in the video stream.

25. The method of claim 24 wherein the film comprises a plurality of frames and selecting the plurality of target images comprises selecting each target image from a different frame of the film.

26. The method of claim 1 further comprising performing the isolating step after the selecting step and performing the extracting step after the isolating step.

27. The method of claim 8 further comprising:
selecting a plurality of target images from the film;
extracting other target image data for the plurality of target images;
placing at least another portion of the other target image data corresponding to each target image in the video stream.

28. The method of claim 27 wherein the film comprises a plurality of frames and selecting the plurality of target images comprises selecting each target image from a different frame of the film.

29. A method for reconfiguring media comprising:
selecting a plurality of target images from a plurality of frames of large format processed motion picture media comprising a sequence of frames for a shot;
identifying a position in a video stream for each target image, the video stream comprising another sequence of other images configured as another shot;
extracting each target image from the motion picture media; and positioning each target image at the identified position in the video stream.

30. The method of claim 29 wherein selecting the plurality of target images comprises selecting each target image from a different frame of the motion picture media.

31. The method of claim 29 wherein selecting the plurality of target images comprises selecting the plurality of target images from a single frame of the motion picture media.

32. The method of claim 29 further comprising positioning each target image in a series of images.

33. The method of claim 29 further comprising transferring the video stream to a media format.

34. The method of claim 29 further comprising sequentially extracting each of the plurality of images and sequentially positioning each of the plurality of images for the video stream.

35. The method of claim 29 further comprising selecting the video stream from a group consisting of a digital media, an analog media, and the digital media and the analog media.

36. A method for reconfiguring media comprising:
selecting a plurality of target images from a plurality of frames of large format processed motion picture media comprising a sequence of frames for a shot;
zooming in on each target image while focusing thereon;
identifying a position in a video stream for each target image, the video stream comprising another sequence of other images configured as another shot;
extracting each target image from the motion picture media after zooming in while focusing thereon; and
positioning each extracted target image at the identified position in the video stream.

37. A method for reconfiguring media comprising:
selecting a plurality of target images from a plurality of frames of a large format processed motion picture media, the motion picture media comprising a sequence of frames for a shot and selected from a first group consisting of large format processed motion picture film and video corresponding to the large format processed motion picture film;
zooming in on each target image while focusing thereon;
identifying a position in a video stream for each target image;
extracting each target image from the motion picture media after zooming in while focusing thereon using at least one member of a second group consisting of a telecine device and a high resolution media scanning device; and
positioning each extracted target image at the identified position in the video stream.

38. A method for recomposing media comprising:
providing instructions to a high resolution media scanning device for operating on large format processed motion picture media, the motion picture media comprising a sequence of frames for a shot, the instructions comprising:
selecting at least one target image in at least one frame of the motion picture media; and
fragmenting the at least one target image from the at least one frame; and operating on the motion picture media in accordance with the instructions provided to the scanning device comprising:
  extracting the fragmented target image; and
  placing at least a portion of the extracted target image in a video stream having another sequence of other images configured as another shot.

39. The method of claim 38 further comprising zooming in on the at least one target image while focusing on the at least one target image prior to extracting the at least one target image.

40. A method for reconfiguring media comprising:
  selecting a plurality of target images from a plurality of frames of a large format processed motion picture film, the large format processed motion picture film comprising a sequence of frames for a shot;
  identifying a position in a video stream for each target image;
  focusing on each target image while zooming in thereon;
  extracting each target image from the large format processed motion picture film after focusing while zooming thereon; and
  positioning each extracted target image at the identified position in the video stream to create another sequence of other frames configured as another shot.

41. A method for reconfiguring media comprising:
  selecting a plurality of target images from a plurality of frames of a large format processed motion picture film, each target image selected from a different frame, the large format processed motion picture film comprising a sequence of frames for a shot;
  identifying a position in a video stream for each target image;
  focusing on each target image while zooming in thereon;
  extracting each target image from the large format processed motion picture film after focusing while zooming thereon; and
  positioning each extracted target image at the identified position in the video stream to create another sequence of other frames configured as another shot.

* * * * *